United States Patent
Sudou

(10) Patent No.: US 8,714,000 B2
(45) Date of Patent: May 6, 2014

(54) AIR FLOW MEASURING DEVICE AND METHOD OF MAKING HOUSING FOR THE DEVICE

(71) Applicant: Denso Corporation, Kariya (JP)

(72) Inventor: Akiyuki Sudou, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/676,167

(22) Filed: Nov. 14, 2012

(65) Prior Publication Data

US 2013/0118242 A1     May 16, 2013

(30) Foreign Application Priority Data

Nov. 14, 2011    (JP) ................................ 2011-248139

(51) Int. Cl.
*G01M 15/04*     (2006.01)
*G01F 1/684*     (2006.01)
*G01F 5/00*      (2006.01)

(52) U.S. Cl.
CPC ............. *G01M 15/042* (2013.01); *G01F 1/684* (2013.01); *G01F 5/00* (2013.01)
USPC ...................... 73/114.32; 73/202.5; 73/204.22

(58) Field of Classification Search
CPC ........... G01F 5/00; G01F 1/684; G01F 15/14; G01F 1/00; G01M 15/04; G01M 15/042; F02D 41/187
USPC ................ 73/114.32–114.34, 204.11–204.27
See application file for complete search history.

(56) References Cited

U.S. PATENT DOCUMENTS

| | | | |
|---|---|---|---|
| 4,641,418 A * | 2/1987 | Meddles | 264/272.17 |
| 6,033,237 A | 3/2000 | Sai et al. | |
| 6,845,661 B2 * | 1/2005 | Bogdanov et al. | 73/204.22 |
| 8,205,493 B2 * | 6/2012 | Mais et al. | 73/202.5 |
| 2004/0069060 A1 | 4/2004 | Bogdanov et al. | |
| 2012/0325011 A1 * | 12/2012 | Takiguchi et al. | 73/861 |

FOREIGN PATENT DOCUMENTS

| | | |
|---|---|---|
| JP | 06-016423 B | 2/1994 |
| JP | 7-142145 A | 6/1995 |
| JP | 11-008007 A | 1/1999 |
| JP | 2004-132351 A | 4/2004 |
| JP | 2011-106868 A | 6/2011 |

OTHER PUBLICATIONS

Office Action issued Oct. 1, 2013 in corresponding JP Application No. 2011-248139 (with English translation).

* cited by examiner

*Primary Examiner* — Freddie Kirkland, III

(57) ABSTRACT

An air flow measuring device includes a housing, a sensor, and a conduction member. The housing defines a bypass flow passage through which taken-in air passes. The sensor is accommodated in the bypass passage and produces an electrical signal as a result of heat transfer between taken-in air and the sensor. The conduction member includes first and second terminals. The first terminal outputs the electrical signal produced by the sensor to outside. The second terminal supplies electric power to the sensor. The housing is provided through an assembly process and a molding process. In the assembly process, the conduction member is held by a primarily shaped product defining the bypass passage to provide an assembly. In the molding process, the assembly, with the conduction member held by the primarily shaped product, is inserted into a predetermined die and a secondary molded part is injection-molded in the die.

5 Claims, 2 Drawing Sheets

UPSTREAM SIDE ←———→ DOWNSTREAM SIDE
DIRECTION OF FLOW
THROUGH INTAKE PASSAGE

UPSTREAM SIDE ←————→ DOWNSTREAM SIDE
DIRECTION OF FLOW
THROUGH INTAKE PASSAGE

AIR FLOW MEASURING DEVICE AND METHOD OF MAKING HOUSING FOR THE DEVICE

CROSS REFERENCE TO RELATED APPLICATION

This application is based on Japanese Patent Application No. 2011-248139 filed on Nov. 14, 2011, the disclosure of which is incorporated herein by reference.

TECHNICAL FIELD

The present disclosure relates to an air flow measuring device that measures a flow rate of air.

BACKGROUND

Conventionally, a thermal-type air flow measuring device for measuring an air flow rate by use of heat transfer between the device and air is widely known. For example, the air flow measuring device is disposed in an intake passage to an internal combustion engine and used for measuring a flow rate of intake air suctioned into the engine. The conventional air flow measuring device takes in a part of air flowing through a predetermined passage, and generates an electrical signal that is in accordance with a flow rate of air in the passage. For example, the conventional device includes the following configuration.

The air flow measuring device includes a housing that defines a bypass flow passage through which the taken-in air passes, a sensor that is accommodated in the bypass flow passage to produce the electrical signal as a result of a heat transfer between the sensor and the taken-in air, a terminal for outputting the electrical signal produced by the sensor to the outside of the device, and a conduction member including a terminal for supplying electric power to the sensor. The sensor is assembled with a processing part that performs predetermined processing on the generated electrical signal thereby to constitute a plate-like sensor assy. The sensor assy is held by the housing such that the sensor projects into the bypass flow passage.

The conventional air flow measuring device is obtained by providing beforehand through insert-molding a molded product having a conduction member (hereinafter referred to as a "molded product with a terminal"), and by injection-molding a secondary molded part, with the molded product with the terminal and the housing which holds the sensor assy as insertion items. For this reason, since the conventional air flow measuring device is provided through at least two insert-moldings, its manufacturing process is complicated, and simplification of the manufacturing process is required.

For a molding method for the conventional molded product with the terminal, in order to avoid cumbersomeness of directly setting a terminal piece as the conduction member in a die, a method whereby a holding member, which has been shaped, is made to hold a terminal piece in advance and the holding member holding the terminal piece is set in a die as the insertion item to provide the molded product with the terminal through insert-molding, is widely known (see, for example, JP-A-H07-142145). However, the providing of the molded product with the terminal by insert-molding is still the same. Thus, the complicatedness of the manufacturing process of the air flow measuring device may not change very much.

SUMMARY

According to the present disclosure, there is provided an air flow measuring device for taking in a part of air flowing through a predetermined passage to produce an electrical signal that is in accordance with a flow rate of air in the passage. The device includes a housing, a sensor, and a conduction member. The housing defines a bypass flow passage through which the taken-in air passes. The sensor is accommodated in the bypass flow passage and configured to produce the electrical signal as a result of a heat transfer between the taken-in air and the sensor. The conduction member includes a first terminal and a second terminal. The first terminal is configured to output the electrical signal produced by the sensor to an outside of the sensor. The second terminal is configured to supply electric power to the sensor. The housing is provided through an assembly process and a molding process. In the assembly process, the conduction member is held by a primarily shaped product defining the bypass flow passage so as to provide an assembly. In the molding process, the assembly, with the conduction member held by the primarily shaped product, is inserted into a predetermined die and a secondary molded part is injection-molded in the die.

According to the present disclosure, there is also provided a method of making a housing for an air flow measuring device that takes in a part of air flowing through a predetermined passage to produce an electrical signal in accordance with a flow rate of air in the passage. The device includes the housing, a sensor, and a conduction member. The housing defines a bypass flow passage through which the taken-in air passes. The sensor is accommodated in the bypass flow passage and configured to produce the electrical signal as a result of a heat transfer between the taken-in air and the sensor. The conduction member has a first terminal and a second terminal. The first terminal is configured to output the electrical signal produced by the sensor to an outside of the sensor. The second terminal is configured to supply electric power to the sensor. According to the method, an assembly process is performed. In the assembly process, the conduction member is held by a primarily shaped product, which defines the bypass flow passage, so as to provide an assembly. Furthermore, a molding process is performed. In the molding process, the assembly, in which the conduction member is held by the primarily shaped product, is inserted into a predetermined die; and a secondary molded part is injection-molded in the die.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
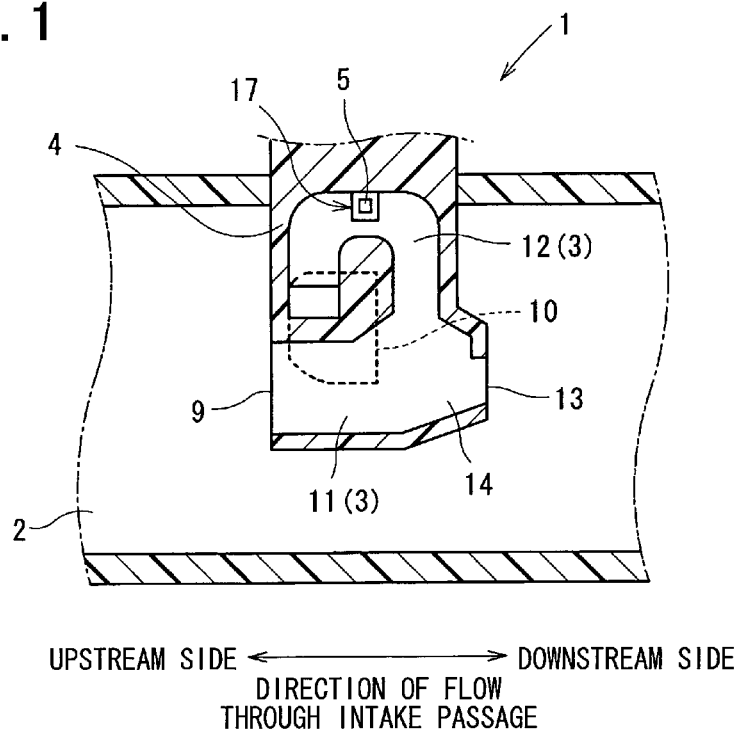
FIG. 1 is a sectional view illustrating an inner part of an air flow measuring device in accordance with an embodiment.
Figure 2:
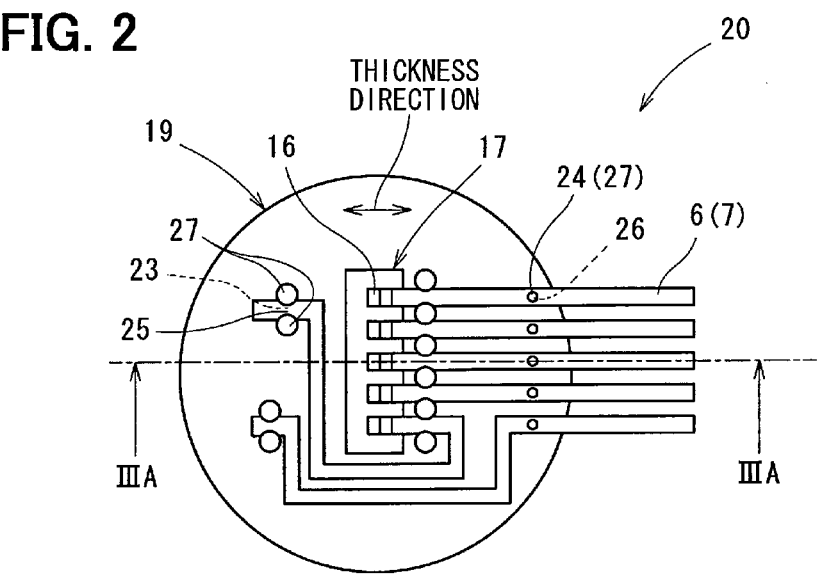
FIG. 2 is a plan view illustrating an assembly according to the embodiment.
Figure 3A:
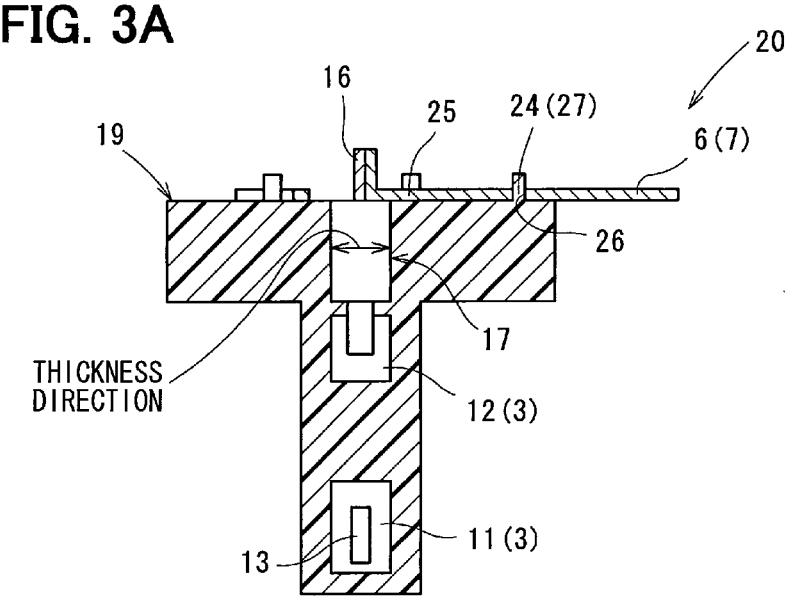
FIG. 3A is a sectional view taken along a line IIIA-IIIA in FIG. 2 illustrating completion of an assembly process.
Figure 3B:
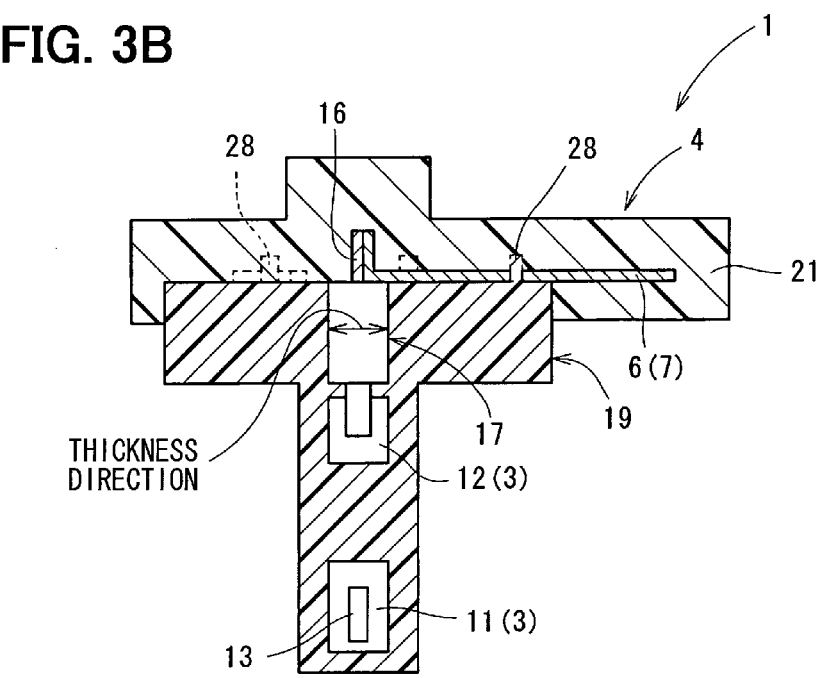
FIG. 3B is a sectional view of the air flow measuring device of the embodiment illustrating completion of a molding process.

An air flow measuring device of an embodiment is for taking in a part of air flowing through a predetermined passage to produce an electrical signal that is in accordance with a flow rate of air in the passage. The device includes a housing, a sensor, and a conduction member. The housing defines a bypass flow passage through which the taken-in air passes. The sensor is accommodated in the bypass flow passage and configured to produce the electrical signal as a result of a heat transfer between the taken-in air and the sensor. The conduction member includes a first terminal and a second terminal. The first terminal is configured to output the electrical signal produced by the sensor to an outside of the sensor. The second terminal is configured to supply electric power to the sensor. The housing is provided through an assembly process and a molding process. In the assembly process, the conduction member is held by a primarily shaped product defining the bypass flow passage so as to provide an assembly. In the molding process, the assembly, with the conduction member held by the primarily shaped product, is inserted into a predetermined die and a secondary molded part is injection-molded in the die.

The primarily shaped product may include a projection that serves as a recess part or a projection part. In the assembly process, the first terminal of the conduction member may be press-fitted to the recess part or the projection part, and the second terminal of the conduction member may be press-fitted to the recess part or the projection part thereby to hold the conduction member by the primarily shaped product. In the molding process, the projection may be melted by injected resin to be welded to the secondary molded part.

The sensor may be assembled with another terminal joined to the first and second terminals of the conduction member and a processing part that performs predetermined processing on the produced electrical signal thereby to constitute a plate-like sensor assembly (ASSY). The sensor ASSY may be held by the housing, such that the sensor projects into the bypass flow passage. The projection may be one of a plurality of projections provided to position the sensor ASSY therebetween in a thickness direction of the sensor ASSY and to be welded to the secondary molded part.

Configuration of an air flow measuring device 1 of the embodiment will be described with reference to the drawings. The air flow measuring device 1 measures an air flow rate by means of heat transfer between the device 1 and air. For example, the air flow measuring device 1 is disposed in an intake passage 2 leading into an internal combustion engine (not shown), and is used for measuring a flow rate of intake air that is suctioned into the engine of a vehicle.

More specifically, the air flow measuring device 1 is disposed in the intake passage 2 to take in a part of intake air so as to produce an electrical signal that is in accordance with a flow rate of intake air in the intake passage 2 (which may hereinafter be referred to as an intake air amount). For example, the device 1 includes the following configuration. The air flow measuring device 1 includes a housing 4 that defines a bypass flow passage 3 through which the taken-in intake air passes, a sensor 5 that is accommodated in the bypass flow passage 3 to generate the electrical signal by a heat transfer between the sensor 5 and the taken-in intake air, and a conduction member 7 including various kinds of terminals 6.

The housing 4 is a resin molded product, and includes the following bypass flow passages 3. The bypass flow passage 3 includes an air-taking port 9 for intake air that opens toward an upstream side in the intake passage 2; a discharge port 10 for intake air that opens toward a downstream side in the intake passage 2; a straight passage 11 that extends linearly from the air-taking port 9 to make the intake air flow straight in the same direction as the flow through the intake passage 2; a circulation passage 12 that makes flow around the intake air flowing straight through the straight passage 11 to divert the air into the discharge port 10; and a dust discharge passage 14 that is connected linearly to the straight passage 11 to direct the dust to a dust discharge port 13.

The sensor 5 projects into a region of the circulation passage 12 where the intake air flowing around through the circulation passage 12 flows in the opposite direction from the flow in the intake passage 2. The circulation passage 12 branches into two passages on the downstream side, and the two discharge ports 10 are thereby provided.

The sensor 5 is assembled with another terminal 16 joined to the terminal 6 of the conduction member 7, and a processing part (not shown) that performs predetermined processing on the generated electrical signal thereby to constitute a plate-like sensor assy 17. The sensor assy 17 is held by the housing 4 such that the sensor 5 projects into the bypass flow passage 3. The conduction member 7 is an assembly of the terminal 6 for outputting the electrical signal produced by the sensor 5 to the outside of the device 1, the terminal 6 for supplying electric power to the sensor 5, and so forth. A part of the terminals 6 is joined and conductive to the terminal 16 of the sensor assy 17.

Characteristics of the air flow measuring device 1 of the embodiment will be described with reference to the drawings. According to the air flow measuring device 1, the housing 4 is provided through an assembly process by which to hold the conduction member 7 by a primarily shaped product 19 that defines the bypass flow passage 3, and a molding process in which an assembly 20 with the conduction member 7 held by the primarily shaped product 19 is inserted into a predetermined die (not shown) and a secondary molded part 21 is injection-molded.

In the assembly process, by press-fitting the respective terminals 6, which constitute the conduction member 7 to a recess 23 and a projection 24 of the primarily shaped product 19, the conduction member 7 is held by the primarily shaped product 19. The terminal 6 includes a constricted part 25 and a hole 26 to be suitable for its press-fitting to the recess 23 and the projection 24. The recess 23 includes, for example, two projections 27. The constricted part 25 is press-fitted into a space between the two projections 27. The projection 24 includes, for example, one projection 27. The projection 27 is press-fitted into the hole 26 of the terminal 6. The projections 27 are provided at more than one position with the sensor assy 17 therebetween in its thickness direction.

In the molding process, the projection 27 is melted by injected resin to be welded to the secondary molded part 21. A resin composite that is formed into the secondary molded part 21, and a resin composite that is formed into the primarily shaped product 19 including the projection 27 has the same composition, and, for example, they are obtained by mixing a reinforcing material such as glass fibers or carbon fibers into thermoplastic resin. The primarily shaped product 19 and the secondary molded part 21 define an interface without being welded to each other at other regions than a welding region 28 between the secondary molded part 21 and the projection 27. A surface of the terminal 6 is also not adhered to the primarily shaped product 19 or the secondary molded part 21, and an interface is formed between the primarily shaped product 19 and this surface and between the secondary molded part 21 and the surface.

Effects of the embodiment will be described. According to the air flow measuring device 1 of the embodiment, the housing 4 is provided through the assembly process in which the conduction member 7 is held by the primarily shaped product 19 that defines the bypass flow passage 3; and the molding process whereby the assembly 20, in which the conduction member 7 is held by the primarily shaped product 19, is inserted into a predetermined die, and the secondary molded part 21 is injection-molded. Accordingly, the need to provide a "molded product with a terminal" through insert-molding with the conduction member 7 as an insertion item is eliminated. As a result, at least one process of insert-molding can be eliminated. For this reason, complicatedness of the manufacturing process of the air flow measuring device 1 can be reduced so as to achieve a cost reduction.

In the assembly process, the conduction member 7 is held by the primarily shaped product 19 by press-fitting the respective terminals 6 to the recess 23 and the projection 24 of the primarily shaped product 19. In the molding process, the projections 27 serving as the recess 23 and the projection 24 is melted by injected resin, to be welded to the secondary molded part 21. Accordingly, the conduction member 7 is strongly positioned relative to the primarily shaped product 19 as a result of its press-fitting to the recess 23 and the projection 24. Thus, in the molding process, a position shift of the terminal 6 can be limited to improve accuracy in attachment of the terminal 6.

As a result of the welding of the secondary molded part 21 and the projection 27, the primarily shaped product 19 and the secondary molded part 21 can restrain each other's heat deformations. For this reason, a heat deformation of the entire housing 4 can be limited so as to limit positional changes over time of the terminal 6 and the sensor assy 17.

Particularly, when the air flow measuring device 1 is used for measuring the amount of intake air suctioned into the engine of the vehicle, the air flow measuring device 1 is disposed in an engine compartment in which a temperature variation that is higher than or equal to 100° C. is repeated. For this reason, there is increased demand on maintenance of reliability of the air flow measuring device 1 by limiting the heat deformation of the housing 4 to limit the positional changes over time of the terminal 6 and the sensor assy 17. Accordingly, by limiting the heat deformation of the entire housing 4 through the welding between the secondary molded part 21 and the projection 27, an effect of inhibiting the positional changes over time of the terminal 6 and the sensor assy 17 can be markedly obtained.

The projections 27 are provided at more than one places with the sensor assy 17 therebetween in its thickness direction, and are welded to the secondary molded part 21. Accordingly, the sensor assy 17 can be sandwiched in the thickness direction by the welding region 28 of the secondary molded part 21 and the projection 27. As a result, the positional changes over time of the terminal 6 and the sensor assy 17 can be further limited. The mode of the air flow measuring device 1 is not limited to the above-described embodiment, and various modifications may be made to the mode of the device 1. For example, the air flow measuring device 1 can be applied to various uses other than the use of measurement of the amount of intake air suctioned into the engine of the vehicle.

To sum up, the air flow measuring device 1 and the method of making the housing 4 for the device 1 in accordance with the above embodiment can be described as follows.

An air flow measuring device 1 is for taking in a part of air flowing through a predetermined passage 2 to produce an electrical signal that is in accordance with a flow rate of air in the passage 2. The device 1 includes a housing 4, a sensor 5, and a conduction member 7. The housing 4 defines a bypass flow passage 3 through which the taken-in air passes. The sensor 5 is accommodated in the bypass flow passage 3 and configured to produce the electrical signal as a result of a heat transfer between the taken-in air and the sensor 5. The conduction member 7 includes a first terminal 6 and a second terminal 6. The first terminal 6 is configured to output the electrical signal produced by the sensor 5 to an outside of the sensor 5. The second terminal 6 is configured to supply electric power to the sensor 5. The housing 4 is provided through an assembly process and a molding process. In the assembly process, the conduction member 7 is held by a primarily shaped product 19 defining the bypass flow passage 3 so as to provide an assembly 20. In the molding process, the assembly 20, with the conduction member 7 held by the primarily shaped product 19, is inserted into a predetermined die and a secondary molded part 21 is injection-molded in the die.

Accordingly, the need to provide a "molded product with a terminal" through insert-molding with the conduction member 7 as an insertion item is eliminated. As a result, at least one process of insert-molding can be eliminated. For this reason, complicatedness of the manufacturing process of the air flow measuring device 1 can be reduced so as to achieve a cost reduction.

The primarily shaped product 19 may includes a projection 27 that serves as a recess part 23 or a projection part 24. In the assembly process, the first terminal 6 of the conduction member 7 may be press-fitted to the recess part 23 or the projection part 24, and the second terminal 6 of the conduction member 7 may be press-fitted to the recess part 23 or the projection part 24 thereby to hold the conduction member 7 by the primarily shaped product 19. In the molding process, the projection 27 may be melted by injected resin to be welded to the secondary molded part 21.

Accordingly, the conduction member 7 is strongly positioned relative to the primarily shaped product 19 as a result of its press-fitting to the recess 23 or the projection 24. Thus, a position shift of the conduction member 7 in the molding process can be limited to improve accuracy in attachment of the conduction member 7. As a result of the welding of the projection 27, which constitutes the recess 23 or the projection 24, and the secondary molded part 21, the primarily shaped product 19 and the secondary molded part 21 can restrain each other's heat deformations. For this reason, the heat deformation of the entire housing 4 can be limited so as to limit the positional changes over time of the sensor 5 and the conduction member 7.

Particularly, when the air flow measuring device 1 is used for measuring the flow rate of intake air suctioned into the engine of the vehicle, the air flow measuring device 1 is disposed in an engine compartment in which a temperature variation that is higher than or equal to 100° C. is repeated. For this reason, there is increased demand on maintenance of reliability of the air flow measuring device 1 by limiting the heat deformation of the housing 4 to limit the positional changes over time of the sensor 5 and the conduction member 7. Accordingly, by limiting the heat deformation of the entire housing 4 through the welding between the secondary molded part 21 and the projection 27, an effect of inhibiting the positional changes over time of the sensor 5 and the conduction member 7 can be markedly produced.

The sensor 5 may be assembled with another terminal 16 joined to the first and second terminals 6 of the conduction member 7 and a processing part that performs predetermined processing on the produced electrical signal thereby to constitute a plate-like sensor assembly (ASSY) 17. The sensor ASSY 17 may be held by the housing 4, such that the sensor 5 projects into the bypass flow passage 3. The projection 27 may be one of a plurality of projections 27 provided to position the sensor ASSY 17 therebetween in a thickness direction of the sensor ASSY 17 and to be welded to the secondary molded part 21. Accordingly, the sensor assy 17 can be sandwiched in the thickness direction by the welding region 28 of the secondary molded part 21 and the projection 27. As a result, the positional changes over time of the sensor 5 and the conduction member 7 can be further limited.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device for taking in a part of air flowing through a predetermined passage to produce an electrical signal that is in accordance with a flow rate of air in the passage, the device comprising:
   a housing defining a bypass flow passage through which the taken-in air passes;
   a sensor accommodated in the bypass flow passage and configured to produce the electrical signal as a result of a heat transfer between the taken-in air and the sensor; and
   a conduction member including:
   a first terminal configured to output the electrical signal produced by the sensor to an outside of the sensor; and
   a second terminal configured to supply electric power to the sensor, wherein
   the first terminal and the second terminal are held by a recess part of a primarily shaped product or a projection part of the primarily shaped product to provide an assembly, the primarily shaped product defining the bypass flow passage; and
   the assembly is insert-molded with a secondary molded part.

2. The air flow measuring device according to claim 1, wherein:
   the primarily shaped product includes a projection that serves as the recess part or the projection part;
   the first terminal of the conduction member is press-fitted to the recess part or the projection part, and the second terminal of the conduction member is press-fitted to the recess part or the projection part to hold the conduction member by the primarily shaped product; and
   the projection is melted by injected resin and welded to the secondary molded part.

3. The air flow measuring device according to claim 2, wherein:
   the sensor is assembled with another terminal joined to the first and second terminals of the conduction member and a processing part that performs predetermined processing on the produced electrical signal to constitute a plate-like sensor assembly (ASSY);
   the sensor ASSY is held by the housing, such that the sensor projects into the bypass flow passage; and
   the projection is one of a plurality of projections provided to position the sensor ASSY therebetween in a thickness direction of the sensor ASSY and welded to the secondary molded part.

4. A method of making a housing for an air flow measuring device that takes in a part of air flowing through a predetermined passage to produce an electrical signal in accordance with a flow rate of air in the passage, the device including:
   the housing defining a bypass flow passage through which the taken-in air passes;
   a sensor accommodated in the bypass flow passage and configured to produce the electrical signal as a result of a heat transfer between the taken-in air and the sensor; and
   a conduction member having:
   a first terminal configured to output the electrical signal produced by the sensor to an outside of the sensor; and
   a second terminal configured to supply electric power to the sensor, the method comprising:
   performing an assembly process, wherein the performing of the assembly process includes holding the first terminal and the second terminal by a recess part of a primarily shaped product or a projection part of the primarily shaped product, so as to provide an assembly, the primarily shaped product defining the bypass flow passage; and
   performing a molding process, wherein the performing of the molding process includes:
   inserting the assembly, in which the conduction member is held by the primarily shaped product, into a predetermined die; and
   injection-molding a secondary molded part in the die.

5. The method according to claim 4, wherein:
   the primarily shaped product includes a projection that serves as the recess part or the projection part;
   the performing of the assembly process further includes press-fitting the first terminal of the conduction member to the recess part or the projection part and press-fitting the second terminal of the conduction member to the recess part or the projection part thereby to hold the conduction member by the primarily shaped product; and
   the performing of the molding process further includes melting the projection by injected resin to weld the projection to the secondary molded part.

* * * * *